United States Patent Office 3,107,199
Patented Oct. 15, 1963

3,107,199
ORGANIC POLYMERIC ARTICLES AND PREPARATION THEREOF
Stanley Tocker, Wilmington, Del., assignor to E. I. du Pont de Nemours and Company, Wilmington, Del., a corporation of Delaware
No Drawing. Filed Sept. 9, 1960, Ser. No. 54,828
15 Claims. (Cl. 161—231)

This invention relates to organic polymeric structures and, particularly, to shaped articles such as polymeric films suitable for outdoor use.

This application is a continuation-in-part of my copending application Serial No. 847,704, filed October 21, 1959.

Many organic polymeric structures, such as structures of polyethylene, polypropylene and the like deteriorate rapidly when subjected to sunlight. The materials are sensitive to light in the ultraviolet range, particularly in the wave length range of 2900–3800 A. Exposure to the ultraviolet light tends to embrittle the structures and reduce the level of their electrical and physical properties substantially. Some polymers acquire an undesirable color upon exposure to ultraviolet light.

The use of certain chemical compounds as ultraviolet light absorbers in mechanical mixture with the polymers is known. Thus, compounds such as benzophenones or salicylic acid esters have been incorporated in the molten polymer prior to forming a structure or they have been coated on the surface of the polymeric structure. In either case, the protection afforded by these compounds is not permanent. The compounds gradually exude to the film surface and disappear from the polymeric structure due to mechanical abrasion or volatility.

The object of the present invention is to provide a substantially permanent weather-resistant organic polymeric shaped article, particularly a self-supporting film, suitable for outdoor use. It is a further object to provide a process for incorporating ultraviolet light absorbent compounds into the polymeric articles so that the compounds are firmly attached to the articles. Other objects will appear hereinafter.

The objects are accomplished by a copolymer of 90–99.99 mole percent of at least one unsaturated compound, compound A, having the structural formula:

wherein $R_1$ is selected from the group consisting of hydrogen and alkyl having 1–4 carbon atoms, and .01–10 mole percent, preferably 0.1–10 mole percent, of at least one unsaturated compound, compound B, having the structural formula:

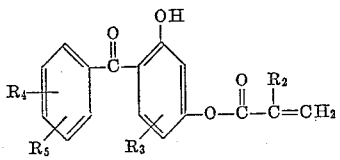

wherein $R_2$ is selected from the group consisting of hydrogen and alkyl having 1–3 carbon atoms and $R_3$, $R_4$ and $R_5$ are each selected from the group consisting of hydrogen, halogen, alkyl and alkoxy, the copolymer preferably having an inherent viscosity of at least 0.3.

Specifically, the objects are accomplished by a copolymer of at least one polymerizable compound selected from the group consisting of ethylene and propylene and .01–10 mole percent, preferably 0.1–10 mole percent, of at least one ethylenically unsaturated compound selected from the group consisting of 2-hydroxy-4-methacryloxybenzophenone, 2-hydroxy-4-acryloxybenzophenone, 2-hydroxy-4-methacryloxy-5-tertiary-butylbenzophenone and 2-hydroxy-4-methacryloxy-2',4'-dichlorobenzophenone, the copolymer having an inherent viscosity of at least 0.3.

Other light stabilizing monomers that may be used in the copolymer are: 2-hydroxy-4-ethacryloxybenzophenone, 2-hydroxy-3-chloro-4-methacryloxybenzophenone, 2-hydroxy-4-methacryloxy-6-methoxybenzophenone, 2-hydroxy-4-methacryloxy-3'-methylbenzophenone, 2-hydroxy-4-acryloxy-3'-ethoxybenzophenone and the like.

COPOLYMERIZATION OF STABILIZING MONOMERS WITH

The process for preparing the copolymers involves subjecting the monomers, preferably in a solvent such as hexane, benzene, toluene, to a temperature of −40° to 300° C. and a pressure of 1–3000 atmospheres in the presence of a catalyst for a contact time sufficient to form the copolymer, usually at least 20 seconds for a continuous process and at least 3 minutes for a batch process, and then isolating the resulting copolymer.

When high pressures are used, 800 atmospheres and above, a conventional peroxide (di-tertiary butyl peroxide) or azo catalyst (alpha,alpha'-azobisdicyclohexanecarbonitrile) may be used and the temperature is preferably 25°–175° C.

It is believed that the essential feature of this type of catalyst, or more properly termed "initiator," is that it is capable of generating free radicals. These free radical initiators, whether they be generated from a peroxide compound or from an azo-type compound combine with a polymerizable monomer to form a new free radical; the new free radical combines with another monomer molecule to form still another free radical; this process is repeated until there is propagated a long polymer chain, as is well known in the art. Polymer chain growth terminates when the free radical-bearing polymer fragment encounters another free radical which, for example, may be another growing polymer chain or an initiator free radical.

Typical peroxides which release free radicals to function as initiators include benzoyl peroxide, di-tertiary-butyl peroxide, tertiary-butyl peracetate, di-tertiary-butyl peroxydicarbonate, 2,2-bis(tertiarybutylperoxy) butane, dimethyl dioxide, diethyl dioxide, dipropyl dioxide, propyl ether dioxide and propyl methyl dioxide. Organic hydroperoxides also applicable are, for example, tertiary-butyl-hydroperoxide, cumene hydroperoxide, ethyl hydroperoxide, and can be used to initiate polymerizations of this kind. Combinations such as ammonium persulfate with a reducing agent can also be used. Typical azo compounds which decompose to liberate free radicals for initiation of polymerization include such catalysts as alpha,alpha'-azobisdicyclohexanecarbonitrile, alpha, alpha'-azobisisobutyronitrile, triphenylmethylazobenzene, 1,1'-azodicycloheptanecarbonitrile, alpha,alpha'-azobisisobutyramide, lithium azodisulfonates, magnesium azodisulfonate, dimethyl alpha,alpha'-azodiisobutyrate, alpha, alpha'-azobis(alpha, gamma-dimethylvaleronitrile) and alpha,alpha'-azobis(alpha, beta-dimethylbutyronitrile).

"Coordination" catalysts, as defined in U.S. Patent 2,822,357, may also be used to effect copolymerization. Specifically, such "coordination" catalysts are composed of:

(A) A compound containing at least one metal of the group consisting of metals of Groups IVa, Va and VIa of the Periodic Table, iron, cobalt, copper, nickel and manganese, said metal having directly attached thereto at least one substituent from the group consisting of halogen, oxygen, hydrocarbon and —O—hydrocarbon; and (B) A reducing compound selected from the group consisting of metal hydrides and compounds having a metal of Groups I, II and III of the Periodic Table, said metal being above hydrogen in the electromotive series, attached directly through a single bond to a carbon atom, said carbon atom selected from the group consisting of trigonal carbon and tetrahedral carbon.

In the above definitions, Periodic Table means Mendeléeff's Periodic Table of the Elements, 25th ed., Handbook of Chemistry and Physics, published by the Chemical Rubber Publishing Co. Specific examples of compound (A) included in the above definition are titanium tetrachloride, titanium tetrafluoride, zirconium tetrachloride, niobium pentachloride, vanadium tetrachloride, vanadyl trichloride, tantalum pentabromide, cerium trichloride, molybdenum pentachloride, tungsten hexachloride, cobaltic chloride, ferric bromide, tetra(2-ethylhexyl)-titanate, tetrapropyl titanate, titanium oleate, octylene glycol titanate, triethanolamine titanate, tetraethyl zirconate, tetra(chloroethyl) zirconate, and the like. Specific examples of compound (B) in this definition are phenyl magnesium bromide, lithium aluminum tetraalkyl, aluminum trialkyl, dimethyl cadmium, diphenyl tin, and the like.

Copolymerization is preferably carried out in a solvent medium. Among the solvents which have been found useful in the present invention are hydrocarbons and halogenated hydrocarbons: hexane, benzene, toluene, cyclohexane, bromobenzene, chlorobenzene, o-dichlorobenzene, tetrachloroethylene, dichloromethane and 1,1,2,2-tetrachloroethane. Heterocyclic compounds such as tetrahydrofuran, thiophene and dioxane may also be used. The preferred solvents are the nonpolar and aromatic solvents, e.g. benzene, hexane, cyclohexane, dioxane, etc. In some instances, copolymerization may be effected without a solvent or in an emulsion or slurry system.

The ratio of the light stabilizing monomer to ethylene and/or other monomer reacted therewith should be such that the final copolymer is composed of .01–10 mole percent, preferably .1–10 mole percent, of the stabilizing compound, the remainder being the other monomer or monomers. Less than .01 percent of the stabilizer does not provide adequate protection against ultraviolet light. More than 10 percent tends to affect adversely the physical properties of the basically polyethylene or polypropylene, etc. structure. Between .1 and 10 percent provides the best protection against ultraviolet light. It has been found that the reaction is very efficient so that a reaction mixture of about .01–10 mole percent of the stabilizing monomer and about 99.99–90 mole percent of the remaining monomer or monomers usually will provide the desired polymer product.

The polymer product, in its preferred form (i.e., reaction product of a light stabilizing monomer and ethylene or the like) is a substantially linear polymer having pendant groups of the formula:

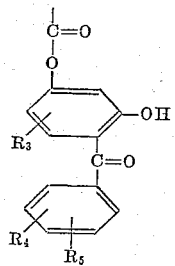

wherein $R_3$, $R_4$ and $R_5$ are each selected from the group consisting of hydrogen, halogen, alkyl and alkoxy, having an inherent viscosity of at least 0.3.

The determination of the structure is accomplished by Infrared Spectral Techniques [1] known to those skilled in the art. The majority of the infrared spectra herein were taken on pressed films by the use of a Perkin-Elmer model 21 spectrophotometer and a Perkin-Elmer Infracord spectrophotometer.

Measurements of ultraviolet light absorption were carried out in accordance with procedures described in "Analytical Chemistry" by C.R.N. Strouts, J. H. Gilfillan and H. N. Wilson, volume II, chapter 22, Oxford University Press, 1955

The invention will be more clearly understood by referring to the examples which follow, Example 1 representing the best mode contemplated for practicing the invention. It is understood that the examples, although illustrating specific embodiments of the present invention, should not be considered limitative of the invention.

The light stability test used in the examples was carried out by exposing the films to the action of a bank of Westinghouse sunlamps for the periods indicated.

Inherent viscosity, which is directly related to the molecular weight of the polymer, is defined by L. H. Cragg in the Journal of Colloid Science, volume I, pages 261–9 (May 1946) as:

$$\text{Inherent viscosity} = \frac{\ln \text{ relative viscosity}}{C}$$

where relative viscosity is the ratio of the solution viscosity to the solvent viscosity, and C is the concentration of solute in solution measured as grams of polymer per 100 ml. of solution.

Example 1

PREPARATION OF 2-HYDROXY-4-METHACRYLOXYBENZOPHENONE AND ITS COPOLYMERIZATION WITH ETHYLENE

A mixture of 10.0 grams of 2,4-dihydroxybenzophenone and 5.0 grams of methacrylyl chloride was treated with 20 ml. of anhydrous pyridine with stirring. After 15 minutes the resultant mixture was heated in a water bath at 70–80° C. for 5 minutes. The reactor was then cooled and the contents were poured into 600 ml. of 3% aqueous hydrochloric acid containing 100 grams of crushed ice. As soon as possible the aqueous mixture was extracted with ether, the ether phase was dried over anhydrous sodium sulfate, and the ether was removed in a vacuum oven at 40–50° C. The resultant product was recrystallized from ethanol containing 15% water, yielding 11.1 grams of pale yellow crystals having a melting point of 76° C.

Infrared analysis showed the presence of ester absorption at 1725 cm.$^{-1}$ and bonded carbonyl at 1650 cm.$^{-1}$ indicating clearly that esterification had taken place on the 4-hydroxyl position. Ultraviolet analysis showed strong maxima at 3400–3500 A. indicative of o-hydroxybenzophenones. Also, infrared absorption characteristic of phenolic hydroxyl absorption in the region of 1050–1300 cm.$^{-1}$ was considerably less than that found for the unesterified starting material, 2,4-dihydroxybenzophenone, which is further indication of esterification.

The chemical analysis was: carbon, 72.35%; hydrogen, 5.18% (calculated for $C_{17}H_{14}O_4$: carbon 72.33%; hydrogen, 5.00%). The product was 2-hydroxy-4-methacryloxybenzophenone.

In a 300 ml. shaker tube was placed a solution of 112 ml. benzene, 0.2 gram of 1,1'-azobisdicyclohexanecarbonitrile and 1.1 grams of the 2-hydroxy-4-methacryloxybenzophenone prepared above. Ethylene was pressured

---

[1] W. M. D. Bryant and R. C. Voter, Journal of American Chemical Society, 75, 6113 (1953). F. W. Billmeyer, "Textbook of Polymer Chemistry," chapter 7, Interscience Publishers, 1957.

in to provide and maintain an autogenous pressure of approximately 13,000 p.s.i. at the polymerization temperature of 90° C. After 1½ hours the reaction was stopped and the product was purified by washing with methanol in an Osterizer. The yield of dried polymer was 19.9 grams.

A clear 2–3 mil film was prepared by pressing a one square inch sample at 100° C. under 20 tons pressure. Infrared analysis, based on the ester band at 1725 cm.$^{-1}$, showed the presence of about 0.5 mole percent of the methacrylic ester units in the polymer. Dissolving the polymer in toluene and reprecipitation did not reduce the ester absorption, indicating that copolymerization had occurred. The inherent viscosity taken on a solution of .09 gram of the polymer in 100 ml. of alpha-chloronaphthalene at 125° C. was 0.74

The film of the copolymer was flexible after 800 hours exposure to a bank of Westinghouse F–S ultraviolet sunlamps; a polyethylene control film after 150 hours cracked upon flexing.

The test film showed no evidence of exudation of the stabilizer, whereas another polyethylene control film containing 2-hydroxy-4-methacryloxybenzophenone but not copolymerized with the polyethylene showed evidence of exudation on long-term exposure.

Example 2

PREPARATION OF 2-HYDROXY-4-ACRYLOXYBENZOPHENONE AND ITS COPOLYMERIZATION WITH ETHYLENE

A solution of 10 grams of 2,4-dihydroxybenzophenone in 60 ml. of water containing 2.4 grams of sodium hydroxide was treated dropwise under vigorous stirring with 4.5 grams of acrylyl chloride. After addition was completed, stirring was continued for 30 minutes. The resultant solid material was filtered and dissolved in 250 ml. of ethanol. This solution was filtered and then allowed to stand for 12 hours at 0- C. The resultant pale yellow crystals which separated were filtered and recrystallized from ethanol. A yield of dried product was 8.1 grams with a melting point of 80–81° C.

An ultraviolet analysis of this material dissolved in carbon tetrachloride showed strong maxima in the spectral region of 3400–3500 A., indicative of o-hydroxybenzophenones. Infrared absorption at 1725 cm.$^{-1}$ was obtained which is characteristic of ester groups. These data indicate that the esterification had taken place on the 4-hydroxy group of the 2,4-dihydroxybenzophenone. The chemical analysis was: carbon, 72.47%; hydrogen, 4.57% (calculated for $C_{16}H_{14}O_2$: carbon, 71.63%; hydrogen, 4.51%). The product was 2-hydroxy-4-acryloxybenzophenone.

The product so prepared was copolymerized with ethylene in the same manner as described in Example 1 except that 3.5 grams of the phenone was employed. Infrared analysis of a 2–3 mil film showed the presence of 1.9 mole percent of ester units in the polymer. Dissolving the polymer in toluene and reprecipitation did not reduce the ester absorption, indicating that copolymerization had occurred. The inherent viscosity of a solution of 0.1 gram of the polymer in 100 ml. of alpha-chloronaphthalene at 125° C. was 2.79.

The polymer was pressed into 3–6 mil films at 125° C. using 10 tons of pressure on one square inch samples of the material. These films survived 700 hours under a bank of Westinghouse F–S sunlamps, whereas the control 3–6 mil polyethylene films cracked upon flexing after 150–200 hours' exposure. It was also observed that incorporation of 500 parts/million of "Suconox"–12 [2] antioxidant into the copolymer by milling on a rubber mill at 100° C. and thereafter exposing the film to ultraviolet light provided a film which remained flexible after over 1000 hours exposure.

---
[2] N-lauryl-para-aminophenol manufactured by the Sumner Chemical Co.

Example 3

PREPARATION OF 2-HYDROXY-4-METHACRYLOXY-2',4'-DICHLOROBENZOPHENONE AND ITS COPOLYMERIZATION WITH ETHYLENE

To a mixture of 27.6 grams of resorcinol dimethyl ether and 42 grams of 2,4-dichlorobenzoyl chloride dissolved in 300 grams of 1,1,2,2-tetrachloroethane maintained below 15° C., there was added slowly with stirring 54 grams of anhydrous aluminum chloride. The resulting mixture was then heated gradually with stirring to 90–95° C. and held at that temperature until there was no further evolution of hydrogen chloride. The reaction mixture was then cooled to 10° C. and there was then added slowly 250 grams of a 10% hydrochloric acid solution. The solvent layer was separated and washed with additional quantities of dilute hydrochloric acid and water. Finally, the layer was washed with ammonium hydroxide solution until it was free of acidic material. The solvent was removed by distillation under reduced pressure and the residue was recrystallized from ethanol to give 2,4-dihydroxy-2',4'-dichlorobenzophenone.

This product was then esterified with methacrylyl chloride according to the procedure described in Example 1. The resulting phenone ester was copolymerized with ethylene in the manner described in Example 1 to give a copolymer containing approximately 0.6 mole percent of bound phenone. A 3-mil film pressed from the copolymer was flexible after 600 hours' exposure under ultraviolet sunlamps, whereas the polyethylene 3-mil control film after 150 hours' exposure cracked upon flexing.

Examples 4–8

PREPARATION OF LAMINAR STRUCTURES

As a further embodiment of this invention, a 1-mil thick film pressed from the copolymer of ethylene and 2-hydroxy-4-methacryloxybenzophenone described in Example 1 was laminated to a 5-mil thick polyethylene film. The latter had been melt pressed from low density polyethylene prepared according to the method described in U.S. Patent No. 2,153,553. A laminate was prepared by placing a 4" diameter sample of each film together and melt pressing the combination at a temperature of 100–110° C. using a pressure of 25 tons.

Under exposure to a bank of ultraviolet sunlamps, with the stabilizer-containing copolymeric film adjacent to the lamps, this laminate remained flexible after 1500 hours of exposure. A control sample of 6-mil thick polyethylene film became embrittled after a period of 275 hours' exposure.

In Example 5, an alternate procedure was used to prepare the laminate. The ethylene/2-hydroxy-4-methacryloxy-benzophenone copolymer was applied to the polyethylene film as a coating. To achieve this, a dispersion was first made by dissolving the copolymer (4 grams) in 100 grams of decalin heated to 100° C., after which the solution was permitted to cool to room temperature to produce a fine dispersion of the copolymer. A 5-mil low density polyethylene film was dipped in the dispersion, then dried in an oven at 80° C. and thereafter melt pressed in a press at 110° C. and 5 tons' pressure. The coating applied in this way was about 0.1 mil thick. The coated film prepared in this way likewise showed enhanced resistance to degradation when exposed to a bank of ultraviolet sunlamps.

For Examples 6 and 7, a film of high density polyethylene made by melt pressing polyethylene prepared as described in U.S. Patent No. 2,816,883 and a film of polypropylene were each laminated to ethylene/2-hydroxy-4-methacryloxybenzophenone copolymer films. In Example 8, the ethylene/2-hydroxy-4-methacryloxybenzophenone copolymer film was laminated to a polyethylene terephthalate film by melt pressing at a temperature of about 150° C. All laminates showed enhanced resistance to ultraviolet light degradation over the high density polyethylene, the polypropylene and the polyethylene terephthalate films alone.

Example 9

COPOLYMERIZATION OF PROPYLENE WITH 2-HYDROXY-4-METHACRYLOXYBENZOPHENONE

To 200 ml. of stirred anhydrous chlorobenzene under nitrogen there was added 0.2 ml. of vanadyl trichloride and 5 ml. of 1 M aluminum triisobutyl. To this there was added simultaneously at 25° C. propylene at the rate of 175 cc./min. and a solution of 2-hydroxy-4-methacryloxybenzophenone (1.5 grams diluted in 20 ml. of chlorobenzene) prepared as in Example 1 at the rate of 0.5 ml./min. The reaction mixture was treated successively with (a) cold 5% hydrochloric acid in methanol, (b) 50% methanol in water and (c) methanol. The solvent was evaporated in a vacuum oven at 70° C. The yield of polymer was 15 grams.

A film was prepared by pressing a one square inch sample of the copolymer at 125° C. under 20 tons of pressure. Examination by infrared technique showed an infrared absorption band at 1725 cm.$^{-1}$ characteristic of an ester group. Dissolving of the polymer in toluene and reprecipitation did not reduce the absorption shown by the ester group further indicating the copolymerization had occurred. The copolymer contained about 0.2 mole percent of the methacrylic ester. A film of the copolymer was flexible after 600 hours' exposure to a bank of Westinghouse F–S ultraviolet sunlamps; a polypropylene control film cracked upon flexing after 120 hours' exposure.

Example 10

COPOLYMERIZATION OF ETHYLENE AND PROPYLENE WITH 2-HYDROXY-4-METHACRYLOXYBENZOPHENONE

In a 300 ml. shaker tube was placed a solution of 112 ml. benzene, 0.2 gram of 1,1'-azobisdicyclohexanecarbonitrile and 1.5 grams of the 2-hydroxy-4-methacryloxybenzophenone as prepared in Example 1. A gas stream composed of 90% by volume of ethylene and 10% by volume of propylene was pressured in to provide and maintain an autogenous pressure of approximately 13,000 p.s.i. at a temperature of 90° C. After 1½ hours of agitation at 90° C., the reaction was stopped and the product was purified by washing with methanol in an Osterizer. The yield of dried terpolymer was 20.2 grams.

A clear 2–3 mil film was prepared by pressing a one square inch sample at 100° C. under 20 tons' pressure. Infrared analysis, based on the ester band at 1725 cm.$^{-1}$, showed the presence of about 0.5 mole percent of the methacrylic ester units in the polymer. Dissolving the polymer in toluene and reprecipitation did not reduce the ester absorption, indicating that polymerization had occurred. The inherent viscosity taken on a solution of .09 gram of the polymer in 100 ml. of alpha-chloronaphthalene at 125° C. was 0.5.

The film of the copolymer was flexible after 600 hours' exposure to a bank of Westinghouse F–S ultraviolet sunlamps; an ethylene/propylene copolymer control film after 75 hours cracked upon flexing.

The test film showed no evidence of exudation of the stabilizer, whereas the ethylene/propylene copolymer control film containing unpolymerized 2-hydroxy-4-methacryloxybenzophenone showed evidence of exudation on long-term exposure.

As indicated in the examples and in the foregoing discussion, the light-stabilizing monomers can be copolymerized with polymerizable unsaturated compounds such as ethylene and propylene. However, any ethylenically unsaturated compound falling within the formula

may be used. Thus, butene-1, pentene-1, hexene-1, etc., may also be used.

A surprising aspect of the present invention lies in the polymerizable light-stabilizing monomer. It should be noted that the starting material is an aromatic compound having substituted thereon two hydroxyl groups, one of which is ortho to a carbonyl group. It is believed that this hydroxyl group ortho to the carbonyl group provides the ultraviolet light stabilizing qualities of the compound. When this compound is converted to the acrylic ester or to the alkyl-substituted acrylic ester, it is unexpectedly found that it is the other hydroxyl group (not the hydroxyl group ortho to the carbonyl group) that apparently reacts exclusively. Thus, the resulting monomer retains its ultraviolet light resistant qualities.

It is also interesting to note that despite the harshness of the copolymerization process from the standpoint of temperature and pressure, the aforementioned orthohydroxyl group is not destroyed nor even affected adversely.

It is of particular interest that the chelated hydroxyl group does not appear to inhibit polymerization. This is indeed surprising in the case of copolymerization with relatively difficult-to-polymerize ethylene and propylene inasmuch as phenolic compounds such as tertiary butylphenol, hydroquinone, tertiary butyl catechol and the like have long been established as agents which can be added to monomeric systems to inhibit polymerization. The final copolymer contains this hydroxyl group in pendant groups attached to the polymeric chain to provide the long-lasting weather-resistant properties in the copolymeric structures.

As copolymeric structures, self-supporting films, supported films (laminates and coatings), filaments, tubing, etc., can be formed from these copolymers for important commercial applications. Thus, these structures will find utility in the preparation of greenhouses, exterior screening, garden hose, as part of automobile exteriors, etc.

It is also possible to graft copolymerize the polymerizable light stabilizing monomer on to a prepolymerized ethylenic or other unsaturated compound of the type defined hereinbefore. This would be especially useful where it was desired to confine the light stabilizing composition to the surface as a coating.

The main advantage of the copolymer of this invention is that a high proportion of the light stabilizing component can be incorporated in a copolymer to give enhanced resistance to degradation from ultraviolet light without causing haziness in the film. It is also clear that the light-stabilizing function is essentially permanent. A further advantage is that a separate processing step, such as milling or dissolution, is not required to incorporate the light-stabilizing composition into the base polymer. The copolymer and its light-stabilizing qualities are provided during the one-step copolymerization. Moreover, incorporation of the light stabilizer by copolymerization in this manner can be done in conventional polymerization equipment.

Having fully described the invention, what is claimed is:

1. A weather-resistant polymeric composition comprising a copolymer of 90–99.99 mole percent of at least one unsaturated compound, compound A, having the structural formula:

wherein $R_1$ is selected from the group consisting of hydrogen and alkyl having 1–4 carbon atoms and .01–10 mole percent of at least one unsaturated compound, compound B, having the structural formula:

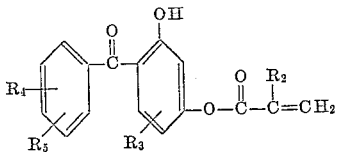

wherein $R_2$ is selected from the group consisting of hydrogen and alkyl having 1–3 carbon atoms, and $R_3$, $R_4$ and $R_5$ are each selected from the group consisting of hydrogen, halogen, alkyl and alkoxy.

2. A weather-resistant self-supporting film which comprises a copolymer of 90–99.99 mole percent of at least one unsaturated compound, compound A, having the structural formula:

wherein $R_1$ is selected from the group consisting of hydrogen and alkyl having 1–4 carbon atoms and .01–10 mole percent of at least one unsaturated compound, compound B, having the structural formula:

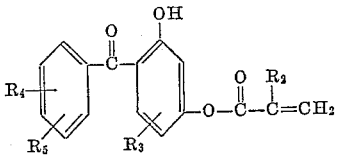

wherein $R_2$ is selected from the group consisting of hydrogen and alkyl having 1–3 carbon atoms, and $R_3$, $R_4$ and $R_5$ are each selected from the group consisting of hydrogen, halogen, alkyl and alkoxy.

3. A copolymer of at least one unsaturated compound selected from group A consisting of ethylene and propylene and .01–10 mole percent of at least one ethylenically unsaturated compound selected from group B consisting of 2-hydroxy-4-methacryloxybenzophenone, 2-hydroxy-4-acryloxybenzophenone, 2-hydroxy-4-methacryloxy-5-tertiarybutylbenzophenone, and 2-hydroxy-4-methacryloxy-2',-4'-dichlorobenzophenone.

4. A copolymer as in claim 3 wherein at least one unsaturated compound of group A is ethylene.

5. A copolymer as in claim 3 wherein at least one unsaturated compound of group A is propylene.

6. A copolymer as in claim 3 wherein at least one ethylenically unsaturated compound of group B is 2-hydroxy-4-methacryloxybenzophenone.

7. A copolymer as in claim 3 wherein at least one ethylenically unsaturated compound of group B is 2-hydroxy-4-acryloxybenzophenone.

8. A process for preparing weather-resistant polymeric material which comprises copolymerizing at least one compound, compound A, having the structural formula:

wherein $R_1$ is selected from the group consisting of hydrogen and alkyl having 1–4 carbon atoms and .01–10 mole percent of at least one compound, compound B, having the structural formula:

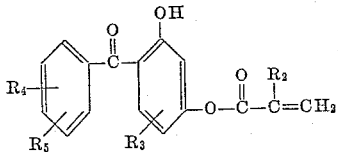

wherein $R_2$ is selected from the group consisting of hydrogen and alkyl having 1–3 carbon atoms, and $R_3$, $R_4$ and $R_5$ are each selected from the group consisting of hydrogen, halogen, alkyl and alkoxy in a solvent for said compounds selected from the group consisting of hexane, benzene, toluene, cyclohexane, bromobenzene, chlorobenzene, o-dichlorobenzene, tetrachloroethylene, dichloromethane, 1,1,2,2-tetrachloroethane, thiophene and dioxane.

9. A process as in claim 8 wherein at least one compound A is ethylene.

10. A process as in claim 8 wherein at least one compound B is 2-hydroxy-4-methacryloxybenzophenone.

11. A process as in claim 8 wherein at least one compound B is 2-hydroxy-4-acryloxybenzophenone.

12. A laminate comprising a base layer adhereably associated with a top layer, said top layer being a copolymer of at least one unsaturated compound, compound A, having the structural formula:

wherein $R_1$ is selected from the group consisting of hydrogen and alkyl having 1–4 carbon atoms and .01–10 mole percent of at least one unsaturated compound, compound B, having the structural formula:

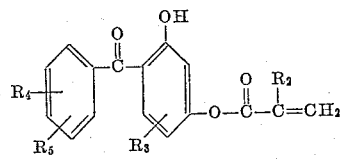

wherein $R_2$ is selected from the group consisting of hydrogen and alkyl having 1–3 carbon atoms, and $R_3$, $R_4$ and $R_5$ are each selected from the group consisting of hydrogen, halogen, alkyl and alkoxy.

13. A laminate as in claim 12 where said base layer is a polyethylene film.

14. A laminate as in claim 12 where said base layer is a polypropylene film.

15. A laminate as in claim 12 where said base layer is a polyethylene terephthalate film.

References Cited in the file of this patent

UNITED STATES PATENTS

| | | |
|---|---|---|
| 2,345,006 | Ross et al. | Mar. 28, 1944 |
| 2,938,883 | Raich | May 31, 1960 |